United States Patent
Maeda et al.

(10) Patent No.: US 12,018,955 B2
(45) Date of Patent: Jun. 25, 2024

(54) SYSTEM AND METHOD FOR PRESENTING ELECTRIC VEHICLE CHARGING OPTIONS

(71) Applicant: Honda Motor Co., Ltd., Tokyo (JP)

(72) Inventors: Eri Izumi Maeda, Rancho Palos Verdes, CA (US); David Wong Cun, Fountain Valley, CA (US); Satoru Shinzaki, Rancho Palos Verdes, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 377 days.

(21) Appl. No.: 16/593,580

(22) Filed: Oct. 4, 2019

(65) Prior Publication Data

US 2021/0046843 A1 Feb. 18, 2021

Related U.S. Application Data

(60) Provisional application No. 62/886,895, filed on Aug. 14, 2019.

(51) Int. Cl.
*B60L 53/68* (2019.01)
*B60L 53/10* (2019.01)
(Continued)

(52) U.S. Cl.
CPC .......... *G01C 21/3476* (2013.01); *B60L 53/11* (2019.02); *B60L 53/305* (2019.02);
(Continued)

(58) Field of Classification Search
CPC .......... G01C 21/3438; G01C 21/3476; G01C 21/34; G01C 21/3407; G01C 21/343;
(Continued)

(56) References Cited

U.S. PATENT DOCUMENTS

| | | |
|---|---|---|
| 8,417,401 B2 | 4/2013 | Takahara et al. |
| 8,615,355 B2 | 12/2013 | Inbarajan et al. |

(Continued)

FOREIGN PATENT DOCUMENTS

| | | |
|---|---|---|
| CN | 106573546 A | 4/2017 |
| CN | 108001282 | 5/2018 |

(Continued)

OTHER PUBLICATIONS

Office Action of U.S. Appl. No. 17/095,013 dated Jan. 28, 2022, 35 pages.

(Continued)

*Primary Examiner* — Russell Frejd
*Assistant Examiner* — Sara J Lewandroski
(74) *Attorney, Agent, or Firm* — RANKIN, HILL & CLARK LLP

(57) ABSTRACT

A system and method for presenting electric vehicle charging options that include determining a current geo-location of an electric vehicle and determining a current state of charge of a battery of the electric vehicle. The system and method also include determining at least one charging station that is within a remaining distance that the electric vehicle is capable of traveling based on the current geo-location of the electric vehicle and the current state of charge of the battery of the electric vehicle. The system and method further include presenting a charging station map user interface that pin points the current geo-location of the electric vehicle and the at least one charging station.

18 Claims, 6 Drawing Sheets

(51) Int. Cl.
*B60L 53/30* (2019.01)
*B60L 53/62* (2019.01)
*B60L 53/64* (2019.01)
*B60L 53/66* (2019.01)
*B60L 58/12* (2019.01)
*G01C 21/34* (2006.01)
*G06F 9/451* (2018.01)

(52) U.S. Cl.
CPC .............. *B60L 53/62* (2019.02); *B60L 53/64* (2019.02); *B60L 53/665* (2019.02); *B60L 53/68* (2019.02); *B60L 58/12* (2019.02); *G06F 9/451* (2018.02); *B60L 2240/60* (2013.01)

(58) Field of Classification Search
CPC ............ G01C 21/3446; G01C 21/3453; G01C 21/3461; G01C 21/3469; G01C 21/3484; G01C 21/3492; G01C 21/3679; G01C 21/3682; G01C 21/3685; G01C 21/3691; G01C 21/3694; G01C 21/3697; G01C 21/38; G01C 21/3804; G01C 21/3807; G01C 21/3811; G01C 21/3815; G01C 21/3819; G01C 21/3822; G01C 21/3826; B60L 53/60; B60L 53/68; B60L 53/62; B60L 53/11; B60L 53/64; B60L 53/12; B60L 53/305; B60L 53/665; B60L 2240/60; B60L 58/12; G06F 9/451
See application file for complete search history.

(56) References Cited

U.S. PATENT DOCUMENTS

| | | | |
|---|---|---|---|
| 8,717,170 B1 | 5/2014 | Juhasz | |
| 8,963,494 B2 | 2/2015 | Kishiyama et al. | |
| 8,965,669 B2 | 2/2015 | Fisher et al. | |
| 9,056,553 B2 | 6/2015 | Cun | |
| 9,112,382 B2 | 8/2015 | Paul et al. | |
| 9,132,746 B2 | 9/2015 | Enomoto et al. | |
| 9,142,978 B2 | 9/2015 | Juhasz | |
| 9,177,306 B2 | 11/2015 | Penilla et al. | |
| 9,379,559 B2 | 6/2016 | O'Connell et al. | |
| 9,448,083 B2 | 9/2016 | Loftus et al. | |
| 9,459,114 B2 | 10/2016 | Saito et al. | |
| 9,545,853 B1 | 1/2017 | Penilla et al. | |
| 9,580,079 B2 | 2/2017 | Long | |
| 9,610,853 B1 | 4/2017 | Miller et al. | |
| 9,685,798 B2 | 6/2017 | Appelbaum et al. | |
| 9,709,988 B2 | 7/2017 | Miller et al. | |
| 9,739,624 B2 | 8/2017 | Rajagopalan et al. | |
| 9,744,871 B2 | 8/2017 | Sabripour | |
| 9,796,280 B2 | 10/2017 | McCool et al. | |
| 9,937,794 B2 | 4/2018 | Bellin et al. | |
| 10,101,397 B2 | 10/2018 | Cooley et al. | |
| 10,168,170 B2 | 1/2019 | North et al. | |
| 10,185,978 B2 | 1/2019 | Khoo et al. | |
| 10,369,974 B2 | 8/2019 | Carlson et al. | |
| 2008/0243330 A1 | 10/2008 | Kato | |
| 2010/0094496 A1 | 4/2010 | Hershkovitz et al. | |
| 2011/0221393 A1* | 9/2011 | Billmaier | B60L 53/63 320/109 |
| 2011/0225105 A1 | 9/2011 | Scholer et al. | |
| 2012/0019204 A1* | 1/2012 | Matsuo | B60L 53/60 320/109 |
| 2014/0021908 A1 | 1/2014 | McCool et al. | |
| 2014/0316939 A1 | 10/2014 | Uyeki | |
| 2015/0183333 A1 | 7/2015 | Forbes, Jr. et al. | |
| 2015/0191097 A1* | 7/2015 | Jones | B60L 58/12 701/22 |
| 2015/0202975 A1 | 7/2015 | Solomon et al. | |
| 2015/0294329 A1 | 10/2015 | Saito et al. | |
| 2016/0264011 A1 | 9/2016 | Yasukawa et al. | |
| 2016/0335377 A1 | 11/2016 | Yamashina et al. | |
| 2017/0010116 A1 | 1/2017 | Inoue et al. | |
| 2017/0030728 A1* | 2/2017 | Baglino | G01C 21/3469 |
| 2017/0074671 A1* | 3/2017 | Yoshimura | H04W 4/46 |
| 2017/0120758 A1 | 5/2017 | Xu et al. | |
| 2017/0168493 A1 | 6/2017 | Miller et al. | |
| 2018/0060778 A1* | 3/2018 | Guo | G01C 21/3667 |
| 2018/0073882 A1 | 3/2018 | North et al. | |
| 2018/0158150 A1 | 6/2018 | Li et al. | |
| 2018/0260887 A1 | 9/2018 | Takatsuka et al. | |
| 2018/0340784 A1 | 11/2018 | Upadhyay et al. | |
| 2018/0370379 A1 | 12/2018 | Chen et al. | |
| 2019/0025068 A1 | 1/2019 | Yoshino et al. | |
| 2019/0143831 A1* | 5/2019 | Birek | B60L 58/14 701/22 |
| 2019/0152335 A1 | 5/2019 | Farber | |
| 2019/0207398 A1 | 7/2019 | Shih et al. | |
| 2019/0285425 A1 | 9/2019 | Ludwick et al. | |
| 2020/0126123 A1 | 4/2020 | Loriaux | |
| 2020/0198658 A1 | 6/2020 | Suzuki et al. | |
| 2020/0254896 A1 | 8/2020 | Lee et al. | |
| 2020/0317084 A1 | 10/2020 | Schaffer et al. | |
| 2020/0376972 A1 | 12/2020 | Martin et al. | |
| 2021/0049907 A1 | 2/2021 | Dhillon et al. | |
| 2021/0380012 A1* | 12/2021 | Tsuda | B60L 53/66 |

FOREIGN PATENT DOCUMENTS

| | | |
|---|---|---|
| CN | 108556661 | 9/2018 |
| CN | 109029477 | 12/2018 |
| CN | 106427635 | 3/2019 |
| CN | 109900288 | 6/2019 |
| CN | 109927566 | 6/2019 |
| CN | 109993342 A | 7/2019 |
| CN | 106447129 | 8/2019 |
| DE | 102010064015 | 6/2012 |
| DE | 102017006944 | 3/2018 |
| EP | 2676832 | 12/2013 |
| FR | 2971874 | 8/2012 |
| JP | 2010230615 | 10/2010 |
| JP | 2011170686 | 9/2011 |
| JP | 5408002 | 2/2014 |
| JP | 2014106137 | 6/2014 |
| JP | 2017116341 | 6/2017 |
| KR | 101845241 | 4/2018 |
| KR | 102046995 | 12/2019 |
| WO | WO2011104883 | 9/2011 |
| WO | WO2019126806 | 6/2019 |

OTHER PUBLICATIONS

Office Action of U.S. Appl. No. 16/654,348 dated Jan. 6, 2022, 49 pages.
Office Action of U.S. Appl. No. 17/095,013 dated Aug. 25, 2021, 36 pages.
Office Action of U.S. Appl. No. 16/654,348 dated May 6, 2022, 42 pages.
Notice of Allowance of U.S. Appl. No. 16/665,717 dated May 5, 2022, 39 pages.
Office Action of U.S. Appl. No. 17/095,013 dated May 13, 2022, 44 pages.
Office Action of U.S. Appl. No. 17/095,013 dated Aug. 12, 2022, 22 pages.
Office Action of U.S. Appl. No. 16/654,348 dated Sep. 6, 2022, 34 pages.
English Translation of JP2017096769A Title: Action Plan Planning and Execution Support Device Date: Jun. 1, 2017 Author: Onimaru HiroYuki (Year: 2017).
Office Action of U.S. Appl. No. 16/654,348 dated Nov. 22, 2022, 25 pages.
Office Action of U.S. Appl. No. 17/095,013 dated Feb. 17, 2023, 28 pages.
Notice of Allowance of U.S. Appl. No. 16/654,348 dated Apr. 13, 2023, 32 pages.
Office Action of U.S. Appl. No. 17/479,380 dated Apr. 21, 2023, 62 pages.
Office Action of U.S. Appl. No. 17/856,538 dated Mar. 27, 2023, 36 pages.

(56) References Cited

OTHER PUBLICATIONS

Office Action of U.S. Appl. No. 17/095,013 dated Dec. 9, 2022, 20 pages.
Office Action of U.S. Appl. No. 17/479,380 dated Jan. 3, 2023, 80 pages.
Office Action of U.S. Appl. No. 17/843,177 dated Dec. 22, 2022, 40 pages.
Office Action of U.S. Appl. No. 17/095,013 dated May 23, 2023, 25 pages.
Office Action of U.S. Appl. No. 17/843,177 dated May 26, 2023, 32 pages.
Woodie, Machine Learning, Deep Learning, and AI: What's the Difference? May 10, 2017, datanami, https://www.datanami.com/2017/05/10/machine-learning-deep-learning-ai-whats-difference/ (Year: 2017).
S. Su, H. Zhao, H. Zhang, X. Lin, F. Yang and Z. Li, "Forecast of electric vehicle charging demand based on traffic flow model and optimal path planning," 2017 19th International Conference on Intelligent System Application to Power Systems (ISAP), San Antonio, TX, USA, 2017, p. 1-6, doi: 10.1109/ISAP (Year: 2017).
Office Action of U.S. Appl. No. 17/856,538 dated Aug. 21, 2023, 18 pages.
Office Action of U.S. Appl. No. 17/095,013 dated Aug. 31, 2023, 28 pages.
Office Action of U.S. Appl. No. 17/479,380 dated Aug. 17, 2023, 40 pages.
Office Action of U.S. Appl. No. 17/843,177 dated Sep. 28, 2023, 23 pages.
Notice of Allowance of U.S. Appl. No. 17/856,538 dated Oct. 11, 2023, 11 pages.
Office Action of U.S. Appl. No. 17/843,177 dated Mar. 1, 2024, 25 pages.
Office Action of U.S. Appl. No. 17/479,380 dated Jan. 18, 2024, 47 pages.

* cited by examiner

SYSTEM AND METHOD FOR PRESENTING ELECTRIC VEHICLE CHARGING OPTIONS

CROSS-REFERENCE TO RELATED APPLICATION

This application claims priority to U.S. Provisional Application Ser. No. 62/886,895 filed on Aug. 14, 2019, which is expressly incorporated herein by reference.

BACKGROUND

Electric vehicles contain electric storage mechanisms (e.g., electric engines powered by rechargeable batteries) to store electricity and power the electric vehicles. The electric storage mechanisms may be replenished periodically by using, for example, charging equipment installed at a residential home or charging equipment installed at public or private charging stations. Operators of electric vehicles may be typically concerned about balancing charging efficiency and costs. In many cases, when operators connect their electric vehicles to charge, the electric vehicles may charge to a maximum state of charge at one or more charging speeds (e.g., 100% state of charge of the rechargeable batteries) regardless of the cost of energy during the charging session.

In many cases, operators may not be aware of additional or alternate locations at which charging may be completed at cheaper rates. In other cases, operators may arrive at a station and may not be able to charge their electric vehicle based on a backlog of additional customers that are charging their respective electric vehicles or are waiting in a queue to charge their respective electric vehicles. Additionally, operators may not be able to take advantage of cost savings with respect to charging stations, charge times, and/or additional charging resources that may be available to them and that may be utilized to balance electric vehicle charging efficiency and costs.

BRIEF DESCRIPTION

According to one aspect, a computer-implemented method for presenting electric vehicle charging options that includes determining a current geo-location of an electric vehicle and determining a current state of charge of a battery of the electric vehicle. The computer-implemented method also includes determining at least one charging station that is within a remaining distance that the electric vehicle is capable of traveling based on the current geo-location of the electric vehicle and the current state of charge of the battery of the electric vehicle. The computer-implemented method further includes presenting a charging station map user interface that pin points the current geo-location of the electric vehicle and the at least one charging station.

According to another aspect, a system for presenting electric vehicle charging options that includes a memory storing instructions when executed by a processor cause the processor to determine a current geo-location of an electric vehicle and determine a current state of charge of a battery of the electric vehicle. The instructions also cause the processor to determine at least one charging station that is within a remaining distance that the electric vehicle is capable of traveling based on the current geo-location of the electric vehicle and the current state of charge of the battery of the electric vehicle. The instructions further cause the processor to present a charging station map user interface that pin points the current geo-location of the electric vehicle and the at least one charging station.

According to still another aspect, a non-transitory computer readable storage medium storing instructions that when executed by a computer, which includes a processor perform a method, the method includes determining a current geo-location of an electric vehicle and determining a current state of charge of a battery of the electric vehicle. The method also includes determining at least one charging station that is within a remaining distance that the electric vehicle is capable of traveling based on the current geo-location of the electric vehicle and the current state of charge of the battery of the electric vehicle. The method further includes presenting a charging station map user interface that pin points the current geo-location of the electric vehicle and the at least one charging station.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
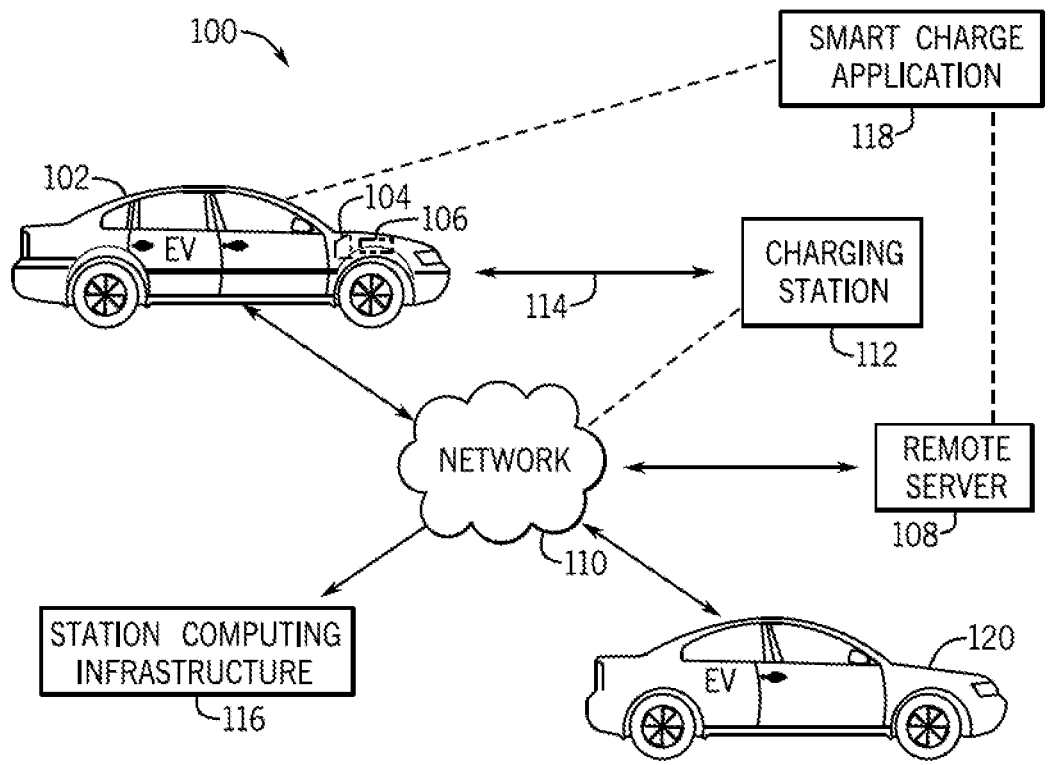
FIG. 1 is a high-level schematic view of an illustrative system for providing enhanced electric vehicle charging according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "computer-readable medium", as used herein, refers to a medium that provides signals, instructions and/or data. A computer-readable medium may take forms, including, but not limited to, non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device may read.

A "data store", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device. The data store can also refer to a database, for example, a table, a set of tables, a set of data stores (e.g., a disk, a memory, a table, a file, a list, a queue, a heap, a register) and methods for accessing and/or manipulating those data in those tables and data stores. The data store can reside in one logical and/or physical entity and/or may be distributed between two or more logical and/or physical entities.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, key fobs, handheld devices, mobile devices, smart phones, laptops, tablets and e-readers.

An "electric vehicle" (EV), as used herein, refers to any moving vehicle that is capable of carrying one or more human occupants and is powered entirely or partially by one or more electric motors powered by an electric battery. The EV may include battery electric vehicles (BEVs), plug-in hybrid electric vehicles (PHEVs) and extended range electric vehicles (EREVs). The term "vehicle" includes, but is not limited to: cars, trucks, vans, minivans, SUVs, motorcycles, scooters, boats, personal watercraft, and aircraft.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview:

Referring now to the drawings, wherein the showings are for purposes of illustrating one or more exemplary embodiments and not for purposes of limiting same, FIG. 1 is a high-level schematic view of an illustrative system 100 for presenting electric vehicle charging options according to an exemplary embodiment of the present disclosure. The components of the system 100, as well as the components of other systems and architectures discussed herein, may be combined, omitted or organized into different architectures for various embodiments.

In the exemplary embodiment of FIG. 1, the system 100 includes an electric vehicle (EV) 102 powered by an electric motor 104 and an electric storage mechanism, for example, a battery 106. In one embodiment, the EV 102 is purely electric in that it only has the electric motor 104. In other embodiments, the EV 102 may have the electric motor 104 and an internal combustion engine (not shown). In some embodiments, the EV 102 may have any number of electric motors, batteries, and/or internal combustion engines and they may operate in series (e.g., as in an extended range electric vehicle), in parallel, or some combination of series and parallel operation.

The EV 102 may be operably connected for computer communication to a remote server 108 via a wireless communication network 110. The EV 102 may transmit and receive data (e.g., state of charge data, energy cost data, charging commands/signals) to and from the remote server 108, and vice versa, through the network 110. The remote server 108 may be a remote computing system or a device remote (e.g., off-board) from the EV 102. The system architectures of the EV 102 and the remote server 108 will be discussed in more detail herein with reference to FIG. 2 and FIG. 3.

In the exemplary embodiment of FIG. 1, the system 100 may include one or more charging stations 112 that may connect to the EV 102 via a (respective) charging link 114. The charging station(s) 112 may include charging equipment (not shown) that may replenish the battery 106 of the EV 102 with charging power. Additionally, in some embodiments, the charging station(s) 112 may be operably connected for computer communication with the EV 102 and/or the remote server 108, for example, to transmit and receive data (e.g., charge parameters, charging data and feedback, vehicle system data) to and from the EV 102 and/or the remote server 108. The charging link 114 may be a wired or wireless link to the charging station(s) 112. Computer communication may occur also via the charging link 114 and/or a wired or wireless communication link. In one embodiment, the EV 102, the charging station(s) 112 and/or the charging link 114 may be operably controlled to initiate or terminate charging of the EV 102 from the charging station(s) 112 based on one or more charging schedules that are implemented within the system 100.

In one or more embodiments, the charging station(s) 112 may include charging equipment that may be installed at a residential home or outside a residential home, for example, at a public (e.g., non-networked) or private (e.g., networked) charging station(s). The charging station(s) 112 may include a charging station identification designation (e.g., identification number, serial number, alpha-numeric code, station name) that may be used to identify particular charging stations 112. The charging station(s) 112 may replenish the battery 106 using a charging energy source type that indicates the type of energy the charging station(s) 112 provides. Energy may include clean renewable energy and non-renewable energy. Clean renewable energy may include, solar energy, hydro energy, biomass energy, wind energy, among others. Non-renewable energy may include electricity from a grid source, and in the case of hybrid vehicles, fossil fuels.

In one or more embodiments, the EV 102 may be configured to output charging power to one or more additional electric vehicles 120 that may be physically linked via a vehicle to vehicle charging link (e.g., physical wired link, wireless link) (not shown) with the EV 102. The EV 102 may also be configured to receive charging power to charge the battery 106 of the EV 102 from one or more additional electric vehicles 120 that may be linked via the vehicle to vehicle charging link with the EV 102. Accordingly, the EV 102 and/or the one or more additional electric vehicles 120 may be configured to complete vehicle to vehicle wireless and/or wireline charging that may be completed in real-time without a current utilization of the charging station(s) 112.

In one or more configurations, the EV 102 may be configured of being capable of being fast charged based on fast charging components (not shown) that may be operably connected to the battery 106 and/or that may be included as part of the battery 106. Fast charging may enable the EV 102 to be charged at a faster charging speed (e.g., than a default charging speed) when being charged by a fast charging electric charging equipment (not shown) that may be included at the charging station(s) 112. In particular, fast charging may provide a higher charging voltage from a default/conventional charging voltage (e.g., increase from 240 volts to 480 volts) to more quickly charge the battery 106 of the EV 102. Accordingly, during utilization of fast charging the battery 106 of the EV 102 may be more quickly charged to a particular state of charge level than during the utilization of a conventional electric vehicle charging speed. The charging station(s) 112 may thereby provide a particular charging rate structure that may pertain to the utilization of the conventional electric vehicle charging speed. Additionally, the charging station(s) 112 may provide a particular charging rate structure that may pertain to the utilization of the fast electric vehicle charging speed.

In an exemplary embodiment, the EV 102, the charging station(s) 112, the additional electric vehicles 120, and/or the remote server 108 may receive and transmit data through the network 110 to a charging station computing infrastructure 116 (station computing infrastructure). The station computing infrastructure 116 may include one or more computing devices (not shown) that may communicate with one or more charging station business entities (e.g., charging station corporate owner) that may include utility providers, fuel providers, and/or entities that own and/or operate one or more various types of charging stations, fuel stations, energy stations, and the like.

In one embodiment, the station computing infrastructure 116 may receive prospective and/or real-time price data that may be provided by each respective charging station(s) 112 to communicate different charging rates. The prospective and/or real-time price data may include charging rates during a certain period of time (e.g., hourly, daily, weekly), charging rates to charge the EV 102 at various charging speeds (e.g., conventional electric vehicle charging speed, fast electric vehicle charging speed, charging power levels), charging rates that may be based on a customer rating that may be applied to an operator of the EV 102, and/or charging rates that may be applied to an operator of the EV 102 based on one or more incentives, discounts, and/or credits that may be provided.

In some embodiments, the station computing infrastructure 116 may determine a price per kilowatt-hour of energy (price per kWh) that may be communicated to the EV 102, the remote server 108, and/or the charging station(s) 112 based on utility rates that are received from the one or more energy providers. The price per kWh may include a dynamic value that may change over time based on a time of day, a season, a region, a time zone, etc. For example, each hour of a particular day may include a different price per kWh based on one or more pricing schemes that are implemented by the one or more energy providers.

In an exemplary embodiment, the system 100 may include a smart charge application 118 that may provide various types of enhancements that may be applicable to the charging of the EV 102 and additional electric vehicles. In an exemplary embodiment, the smart charge application 118 may be executed by the EV 102 (e.g., a processor, an electronic control unit) and/or the remote server 108 (e.g., a processor). The smart charge application 118 may include various modules and/or logic (not shown) to provide enhancements to the electric vehicle charging systems from the prospective of the operator of the EV 102, as discussed below.

In particular, the smart charge application 118 may be configured to provide one or more user interfaces to the operator of the EV 102 (and operators of additional electric vehicles 120) that may allow the operator to visually compare charging rates, charging infrastructure, charging queues, and/or additional charging related information that may pertain to various charging stations 112 that may be located within a particular vicinity of a real-time geo-location(s) of the EV 102, a prospective (e.g., predicted) geo-location(s) of the EV 102, and/or a dynamically based determined geo-location(s) that may be based on one or more factors associated with the EV 102.

Figure 2:
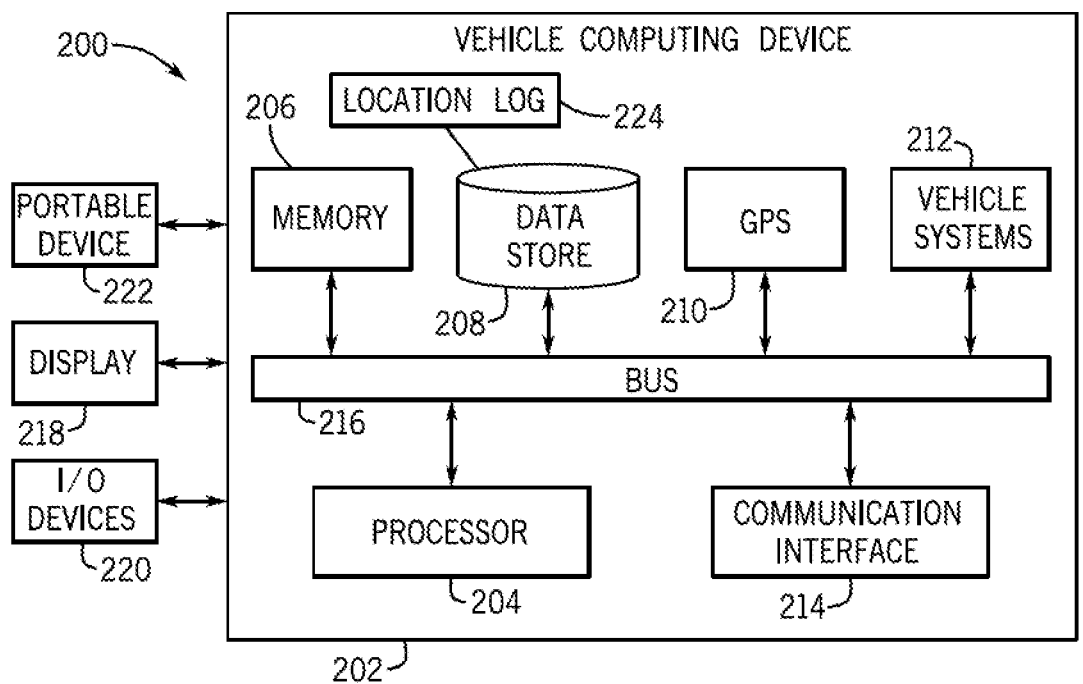
FIG. 2 is a schematic view of an illustrative electric vehicle architecture according to an exemplary embodiment of the present disclosure.

Referring now to FIG. 2, a schematic view of an illustrative electric vehicle architecture 200, for example the EV 102 of FIG. 1, is shown according to an exemplary embodiment. In particular, the EV 102 may include a vehicle computing device 202 (e.g., a telematics unit, an electronic control unit) with provisions for processing, communicating and interacting with various components of the EV 102 and other components of the system 100. The vehicle computing device 202 may include a processor 204, a memory 206, a data store 208, a position determination device 210 (GPS), a plurality of vehicle systems 212 (e.g., including the electric motor 104, the battery 106) and a communication interface 214. The components of the architecture 200, including the vehicle computing device 202, may be operably connected for computer communication via a bus 216 (e.g., a Controller Area Network (CAN) or a Local Interconnect Network (LIN) protocol bus) and/or other wired and wireless technologies. The vehicle computing device 202 as well as the EV 102 may include other components and systems not shown.

The data store 208 may store application data that may also include data pertaining to the smart charge application 118. In one embodiment, the data store 208 of the EV 102 may include a location log 224 that may optionally (e.g., based on user approval) keep a log of locations at which the EV 102 is driven, parked, and/or charged. The location log 224 may be analyzed by the smart charge application 118 in comparison to point of interest data that may be provided by the station computing infrastructure 116 and stored on the data store 208 of the EV 102 (e.g., pre-stored by the OEM) and/or stored on the data store 308 of the remote server 108 (e.g., pre-stored by a charging station entity). Upon analyzing the location log 224, the smart charge application 118 may be configured to determine one or more travel routines that may be followed by the operator of the EV 102.

The communication interface 214 of the EV 102 may provide software, firmware and/or hardware to facilitate data input and output between the components of the vehicle computing device 202 and other components, networks and data sources. Further, the communication interface 214 may facilitate communication with a display 218 (e.g., a head unit, a display stack, a heads-up display) in the EV 102 and other input/output devices 220, for example, a portable device 222 (e.g., key fob, smart phone) connected to the EV 102.

In some embodiments the portable device 222 may include some or all of the components and functionality of the vehicle computing device 202. Additionally, the communication interface 214 may facilitate communication between the EV 102 and the portable device 222 that may include a display and/or input/output devices (not shown) be used to operate various functions of the EV 102. In one embodiment, the display 218 of the EV 102 and/or the portable device 222 (e.g., through a display screen of the portable device 222) may be utilized to provide one or more user interfaces that may be included as a human machine interface(s) of the smart charge application 118.

Figure 3:
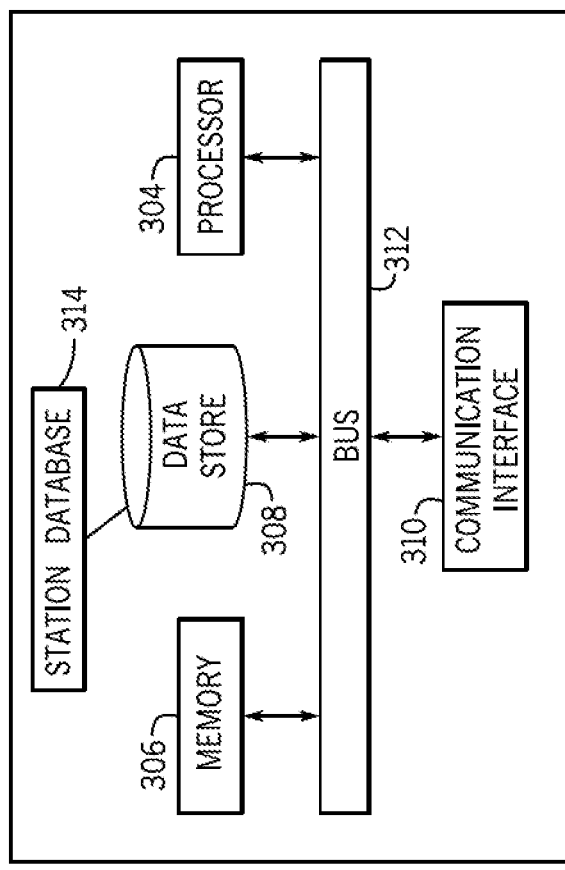
FIG. 3 is a schematic view of an illustrative remote server architecture according to an exemplary embodiment of the present disclosure.

Referring now to FIG. 3, a schematic view of an illustrative remote server architecture 300, for example the remote server 108 of FIG. 1, is shown according to an exemplary embodiment. The remote server 108, is located remotely (i.e., off-board) from the EV 102 (as shown in FIG. 1). In some embodiments, the remote server 108 may be maintained by a charging station entity, an Original Equipment Manufacturer (OEM) (e.g., of the EV 102), a utility provider, a regulatory body, among others. In additional embodiments, the remote server 108 may be another type of remote device or supported by a cloud architecture. In FIG. 3, the remote server 108 may include a computing device 302 that may further include a processor 304, a memory 306, a data store 308 and a communication interface 310. The components of the architecture 300, including the computing device 302, may be operably connected for computer communication via a bus 312 and/or other wired and wireless technologies. The computing device 302 as well as the remote server 108 may include other components and systems not shown.

The data store 308 may store application data that may also include data pertaining to the smart charge application 118. In one configuration, the data store 308 may include a customer dataset (not shown) that may include data pertaining to operators of electric vehicles (including the operator of the EV 102) that may utilize the charging station(s) 112. In one configuration, the customer dataset may include a charging schedule that may be associated with the EV 102 utilized by the operator. As discussed below, the smart charge application 118 may allow the operator and/or the charging station entity to update the charging schedule associated with the EV 102 and/or additional electric vehicles 120 that may utilize one or more charging stations 112. Additionally, the customer dataset may include a subjective customer rating (e.g., 1-10 value) that may be applicable to the operators of electric vehicles as determined by the application 118 and/or one or more charging station entities that may be provided based on one or more factors.

In one configuration, the data store 308 of the remote server 108 may include a station database 314 that may include respective records of charging stations 112 that may be owned and/or operated by one or more charging station entities. The station database 314 may include records that each pertain to particular charging stations 112 that include data that may be pre-updated and/or updated in real-time by one or more charging station entities. In one configuration, the station database 314 may include records that may pertain to particular charging stations 112 and their respective geo-locations (GPS/DGPS coordinates of the charging station(s) 112).

The station database 314 may also include records that may pertain to one or more particular charging stations 112 and one or more pricing schemes that may be implemented by the respective charging stations 112. The one or more pricing schemes may include a price per kWh that may include a dynamic value that may change over time based on a time of day, a season, a region, a time zone, charging power requirements, a charging speed, charging queue place, customer incentives, etc. For example, each hour of a particular day may include a different price per kWh based on one or more pricing schemes that are implemented by the one or more energy providers. Additionally, the one or more pricing schemes may include price per kWh that may be influenced based on a customer rating associated with a respective operator and/or additional factors including, but not limited to, purchase of goods and/or services from the charging station entity and/or additional retailers/service providers. In some embodiments, the station database 314 may also include records that pertain to particular charging stations 112 and current utilization of the charging stations 112. The current utilization of the charging stations 112 may pertain to wait times that may be applicable with respect to the charging of the EV 102.

In one configuration, the communication interface 310 may provide software, firmware and/or hardware to facilitate data input and output between the components of the computing device 302 and other components, networks and data sources. In some embodiments, the communication interface 310 may be used to communicate with the EV 102, the charging station(s) 112, the portable device 222, additional electric vehicles 120, and/or other components of system 100 and architecture 200.

II. The Smart Charge Application and Related Methods

The smart charge application 118 and its components will now be discussed in more detail according to an exemplary embodiment and with continued reference to FIGS. 1-3. In one or more embodiments, the smart charge application 118 may be executed by the vehicle computing device 202 of the EV 102 and/or the computing device 302 of the remote server 108. In an alternate embodiment, the smart charge application 118 may be executed by a processor (not shown) of the portable device 222 that may be used by the operator of the EV 102.

In one or more configurations, data may be sent or received from the smart charge application 118 to the components of the EV 102, the remote server 108, the charging station(s) 112, the charging link 114, the portable device 222, and/or the additional electric vehicles 120. For example, commands from the smart charge application 118 may be sent to the charging station(s) 112 and/or the charging link 114 to initiate or terminate charging of the EV 102 during one or more periods of time based on the one or more factors and/or the one or more charging schedules.

In an exemplary embodiment, the smart charge application 118 may include one or more user input interfaces and/or input means (e.g., buttons) that may be presented via the display 218, presented via the portable device 222, and or included within the EV 102 and/or on the portable device 222. In one embodiment, the one or more user input interfaces and/or input means may include user interface inputs that may be utilized by an individual (e.g., the operator of the EV 102) to enable or disable the presentation of one or more user interface graphics that may be presented by the smart charge application 118. Additionally, the one or more user input interfaces and/or input means may include user interface inputs that may be utilized by an individual to enable or disable one or more smart charging functions provided by the smart charge application 118.

As discussed above, the smart charge application 118 may be configured to provide one or more user interfaces to the operator of the EV 102 (and operators of additional electric vehicles) that may allow the operator to visually compare charging rates, charging infrastructure, charging queues, and/or additional charging related information that may pertain to various charging stations 112 that may be located within a particular vicinity of a current (e.g., real-time) geo-location of the EV 102, a prospective (e.g., predicted) geo-location(s) of the EV 102, and/or a dynamically based determined geo-location(s) that may be based on one or more factors associated with the EV 102.

Figure 4:
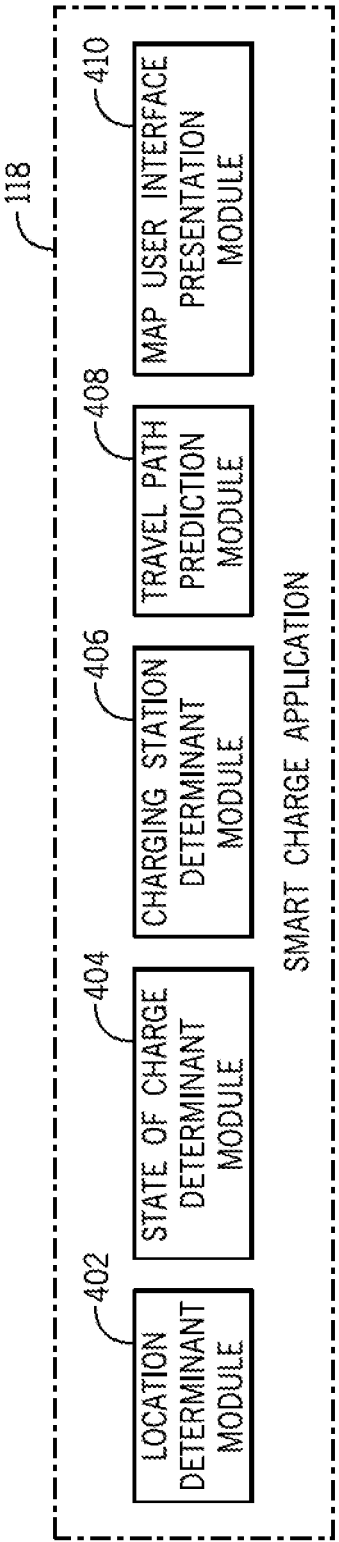
FIG. 4 is a schematic view of a plurality of modules of a smart charge application that may execute computer-implemented instructions for presenting electric vehicle charging options according to an exemplary embodiment of the present disclosure.

FIG. 4 is a schematic view of a plurality of modules 402-410 of a smart charge application 118 that may execute computer-implemented instructions for presenting electric vehicle charging options according to an exemplary embodiment of the present disclosure. In an exemplary embodiment, the plurality of modules 402-410 may include a location determinant module 402, a state of charge determinant module (SOC determinant module) 404, a charging station determinant module 406, a travel path prediction module 408, and a map user interface presentation module (map presentation module) 410. It is appreciated that the smart charge application 118 may include one or more additional modules and/or sub-modules that are included in lieu of the modules 402-410.

In one or more configurations, the location determinant module 402 of the smart charge application 118 may be configured to determine the current geo-location of the EV 102 (e.g., current GPS/DGPS coordinates of the EV 102). In particular, the location determinant module 402 may be configured to communicate with the GPS 210 of the EV 102 to determine the current geo-location of the EV 102 at one or more points in time. In some embodiments, the location determinant module 402 may be configured to store the one or more geo-locations of the EV 102 determined at one or more points in time within the data store 208 of the vehicle computing device 202 and/or the data store 308 of the remote server 108.

In an exemplary embodiment, the SOC determinant module 404 may be configured to determine a current state of charge (SOC) (e.g., charging level) of the battery 106 of the EV 102. In one configuration, the SOC determinant module 404 may be configured to communicate with the processor 204 of the vehicle computing device 202 to determine the current SOC of the battery 106 of the EV 102. In one embodiment, the processor 204 may be configured to communicate with a micro-processor (not shown) that may be included as part of electrical circuitry of the battery 106 to determine a current SOC of the battery 106.

In one or more embodiments, upon determining one or more geo-locations of the EV 102, the location determinant module 402 may be configured to communicate respective data to the charging station determinant module 406. In one embodiment, upon receiving data pertaining to a current geo-location of the EV 102, the charging station determinant module 406 may be configured to determine geo-locations of one or more charging stations 112 that may be located within a predetermined distance (e.g. 5 miles in one or more directions) of the current geo-location of the EV 102.

In particular, the charging station determinant module 406 may be configured to access the station database 314 stored upon the data store 308 of the remote server 108. As discussed, the station database 314 may include records that each pertain to particular charging stations 112 that include data that may be pre-updated and/or updated in real-time by one or more charging station entities. Such records may pertain to particular charging stations 112 and their respective geo-locations. Accordingly, the charging station determinant module 406 may be configured to access and query the station database 314 to determine one or more charging stations 112 that may be located within a predetermined distance (e.g., 5 miles) of the current geo-location of the EV 102.

In another embodiment, the SOC determinant module 404 may be configured to determine the SOC of the battery 106 of the EV 102 at one or more points in time based on communication with the processor 204 of the vehicle computing device 202 of the EV 102. The SOC determinant module 404 may be additionally configured to analyze the current geo-location of the EV 102 and determine a remaining distance that the EV 102 is capable of traveling. The remaining distance may be determined based on analyzing the current SOC of the battery 106, an average speed of the EV 102, and/or one or more road types (e.g., local, highway, road grades) that may be located within a vicinity of the current geo-location of the EV 102. Upon determining the current SOC and remaining distance that the EV 102 may travel at the average speed of the EV 102, the SOC determinant module 404 may communicate respective data to the charging station determinant module 406.

In one embodiment, the charging station determinant module 406 may be configured to analyze the current geo-location of the EV 102 as determined and communicated by the location determinant module 402 in addition to the current SOC and remaining distance that the EV 102 may travel as determined and communicated by the SOC determinant module 404. The charging station determinant module 406 may thereby be configured to determine one or more charging stations 112 that may be located within a distance that the EV 102 may travel to reach based the charging station(s) on the current geo-location of the EV 102, the current SOC of the battery 106 of the EV 102, and/or one or more road types (e.g., local, highway, road grades) that may be located within a vicinity of the current geo-location of the EV 102.

In another embodiment, the charging station determinant module 406 may be configured to determine the location of additional electric vehicles 120 that may be configured to provide charging power to charge the battery 106 of the EV 102. As discussed above, the additional electric vehicles 120 may additionally or alternatively be configured to receive charging power from the EV 102. In particular, the charging station determinant module 406 may be configured to communicate with GPS devices (not shown) of the additional electric vehicles 120 to determine respective geo-locations of the additional electric vehicles 120.

In one configuration, upon determining the respective geo-locations of the additional electric vehicles 120 the charging station determinant module 406 may be configured to analyze the current geo-location of the EV 102 as determined based on communication received from the location determinant module 402. The charging station determinant module 406 may be configured to compare the current geo-location of the EV 102 to the respective geo-locations of the additional electric vehicles 120 to determine one or more additional electric vehicles 120 that may be located within a predetermined distance of the EV 102.

In another configuration, upon determining the respective geo-locations of the additional electric vehicles 120, the charging station determinant module 406 may be configured to analyze the current geo-location of the EV 102 and the current SOC of the battery 106 of the EV 102, as determined based on communication received from the SOC determinant module 404. The charging station determinant module 406 may be configured to compare the current geo-location of the EV 102 to the respective geo-locations of the additional electric vehicles 120. Additionally, the charging station determinant module 406 may analyze the remaining distance that the EV 102 may travel as determined and communicated by the SOC determinant module 404 to thereby determine one or more additional electric vehicles 120 that may be located within a distance that the EV 102 may travel to reach the charging station(s) 112 based on the current geo-location of the EV 102, the current SOC of the battery 106 of the EV 102, and/or one or more road types that may be located within a vicinity of the current geo-location of the EV 102. The charging station determinant module 406 may be configured to communicate data determined by the module 406 to the map presentation module 410 of the smart charge application 118.

In an exemplary embodiment, the travel path prediction module 408 of the smart charge application 118 may be configured to predict one or more prospective travel paths of the EV 102 based on the determination and analysis of one or more travel routines that may be followed by the operator of the EV 102. As discussed above, the location log 224 stored on the data store 208 of the vehicle computing device 202 may include a log of locations at which the EV 102 is driven, parked, and/or charged. In one configuration, the travel path prediction module 408 may analyze the location log 224 to determine one or more point of interest locations that may be frequently and/or routinely traveled to by the EV 102. In particular, the travel path prediction module 408 may analyze point of interest data (not shown) that may be stored on the data store 208 of the vehicle computing device 202 and/or the data store 308 of the remote server 108 to determine one or more points of interest locations that may be frequently and/or routinely traveled to by the EV 102.

Upon analyzing the location log 224, the travel path prediction module 408 may be configured to determine one or more travel routines that may be followed by the operator of the EV 102. In some configurations, the one or more travel routines may be analyzed through a neural network (not shown) to provide computer/machine based/deep learning techniques to determine whether a particular trip of the EV 102 is a routine trip or non-routine trip based on the analysis of data provided by the GPS 210.

In one embodiment, the travel path prediction module 408 may analyze the current geo-location of the EV 102 at one or more points in time with respect a particular timeframe of utilization of the EV 102 and one or more routine trips that may be determined to thereby predict one or more prospective travel routes that may be utilized by the EV 102 to reach one or more points of interest locations that may be frequently and/or routinely traveled to by the EV 102. The travel path prediction module 408 may thereby communicate data pertaining to the prospective travel routes to the charging station determinant module 406.

In one embodiment, upon receiving data pertaining to one or more prospective travel routes of the EV 102, the charging station determinant module 406 may be configured to access and query the station database 314 to determine one or more charging stations 112 that may be located within a predetermined distance of one or more prospective travel paths that are predicted to be utilized by the EV 102 based on one or more travel routines of the operator of the EV 102.

In one embodiment, the travel path prediction module 408 may be configured to communicate one or more prospective travel paths that are predicted to be utilized by the EV 102 to the SOC determinant module 404. The SOC determinant module 404 may be configured to analyze the current SOC of the battery 106 of the EV 102 and the one or more prospective travel paths to predict one or more prospective SOC levels of the battery 106 during prospective travel of the EV 102. The one or more prospective SOC levels of the battery 106 may be based on the current SOC of the battery 106, an average speed of the EV 102, and/or one or more road types (e.g., local, highway, road grades) of the one or more prospective travel paths of the EV 102 as predicted by the travel path prediction module 408. Upon determining the prospective SOC levels of the battery 106, the SOC determinant module 404 may communicate data pertaining to the one or more prospective travel paths of the EV 102 and the one or more associated prospective SOC levels of the battery 106 to the charging station determinant module 406.

In one configuration, the charging station determinant module 406 may be configured to analyze the one or more prospective travel paths of the EV 102 and the associated prospective SOC levels of the battery 106 of the EV 102. The charging station determinant module 406 may thereby access and query the station database 314 to determine one or more charging stations 112 that may be located within a distance that the EV 102 may travel to reach based on the one or more prospective travel paths of the EV 102 and the associated prospective SOC level(s) of the battery 106 of the EV 102. Accordingly, the charging station determinant module 406 may determine one or more charging stations 112 that may be located on or within a predetermined distance of one or more prospective travel paths of the EV 102 and that may be located within a distance that is reachable by the EV 102 based on associated prospective SOC levels of the battery 106. As discussed above, the charging station determinant module 406 may be configured to communicate data determined by the module 406 to the map presentation module 410 of the smart charge application 118.

In an exemplary embodiment, the map presentation module 410 of the smart charge application 118 may be configured to present one or more charging station map user interfaces that present data determined and/or predicted by the modules 402-408, as discussed above. In particular, the charging station map interface(s) may include a map that may pin point a current geo-location of the EV 102 and/or a prospective geo-location of the EV 102 on one or more prospective travel paths of the EV 102.

Figure 5:
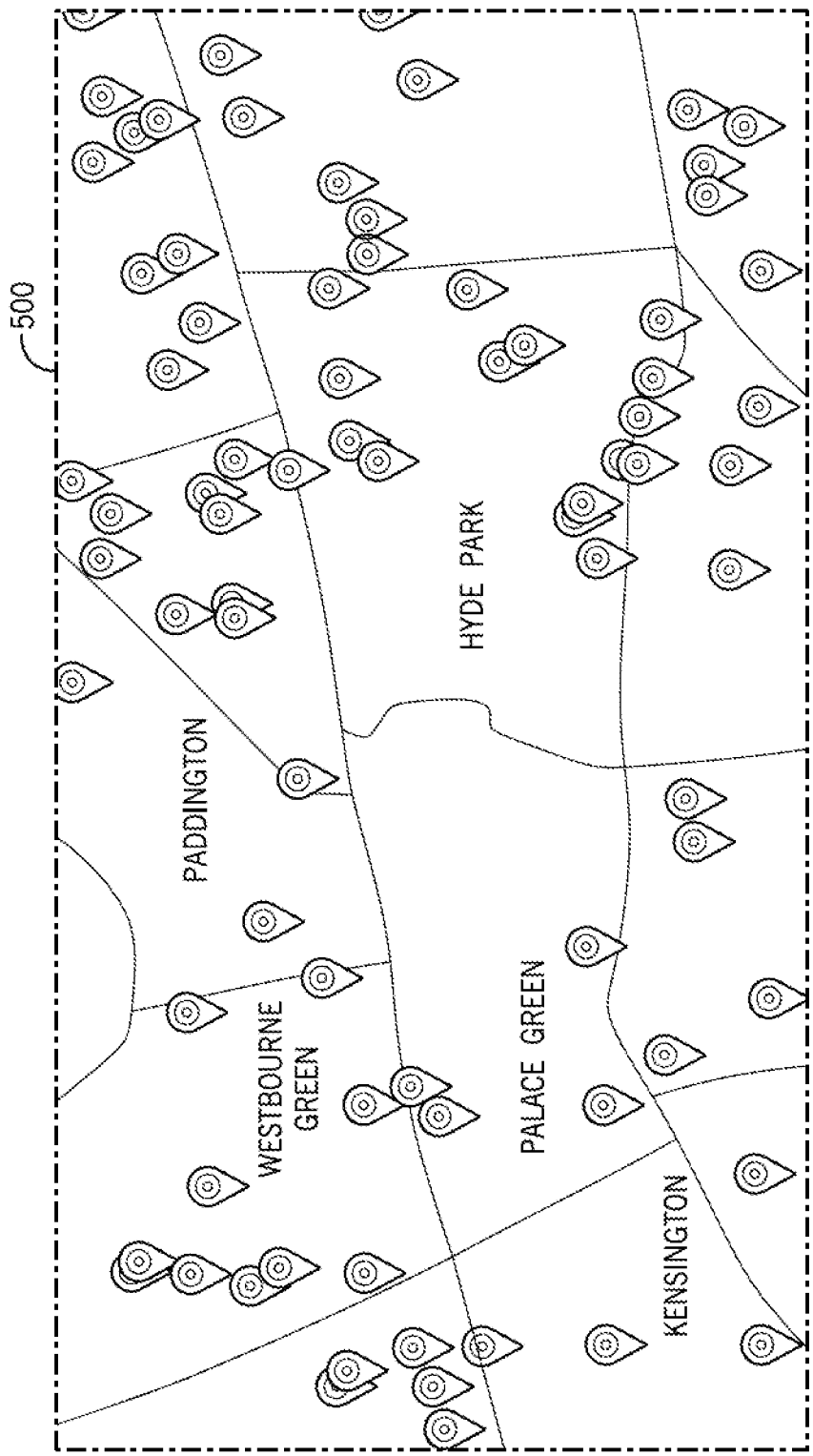
FIG. 5 is an illustrative example of a charging station map user interface according to an exemplary embodiment of the present disclosure.

As shown in FIG. 5, an illustrative example of a charging station map user interface 500 according to an exemplary embodiment of the present disclosure, the charging station map user interface 500 may be presented with pin points that are associated with respective charging stations 112. The charging station map user interface 500 may be presented through a display unit of the EV 102 (e.g., head unit display, head up display, dash board display) and/or a display of the portable device 222. As discussed below, the map presentation module 410 may present the charging station map user interface 500 to pin point a current geo-location of the EV 102, one or more prospective geo-locations of the EV 102, and the geo-location(s) of one or more charging stations 112 that may be located within the predetermined distance of the EV 102, within a predetermined distance of one or more prospective pathways of the EV 102, near one or more points of interest at which one or more routine activities may take place, and/or at one or more locations at which the EV 102 may need to be charged to maintain a sufficient SOC to be utilized complete one or more remaining routine activities and/or non-routine activities.

In some configurations, the charging station map user interface 500 may be presented in two-dimensional format (as shown in FIG. 5). In additional configurations, the charging station map user interface 500 may be converted to a three-dimensional format, a street-view format, a first person point of view format, a satellite view format, and the like based on the receipt of a respective user interface input.

The charging station map user interface 500 may be selectively enabled or disabled based on the receipt of a respective user interface input. In some configurations, the charging station map user interface 500 may be enabled based on a predetermined SOC level of the battery 106 of the EV 102 (e.g., 30% remaining SOC) and/or a user based enablement setting that may be associated with the geo-location of the EV 102 and/or a particular timeframe (e.g., particular day of the week). Upon enablement, the charging station map user interface 500 may be initially presented in a format that may show an area that may be included within a predetermined distance or user selected distance of the geo-location of the EV 102. The charging station map user interface 500 may be configured to be zoomed in or zoomed out to show a smaller area or larger area based on the adjustment of the distance of the geo-location of the EV 102 that is to be presented. Accordingly, the operator of the EV 102 may be able to view data associated with one or more charging stations 112 that may be located at a variable distance from the current geo-location of the EV 102 and/or one or more prospective travel paths of the EV 102.

In one embodiment, the operator may selectively input one or more charging stations 112 and/or charging station entities that own and/or operate particular charging stations 112 as favorites. Such favorites may be shown as highlighted or accompanied with a user interface graphic (e.g., star) that may allow the operator to easily identify them on the charging station map user interface 500. Additionally, the operator may selectively input one or more charging stations 112 and/or charging station entities that own and/or operate particular charging stations 112 as prohibited. Such prohibited charging stations 112 and/or charging stations 112 that are owned and/or operated by prohibited charging station entities may not be pin pointed on the charging station map user interface 500.

In additional embodiments, the operator may selectively input threshold preferences related to price schemes, queue/wait times, price incentives, charging types, and the like that may be utilized to pin point one or more charging stations 112 on the charging station map user interface 500. For example, the operator may choose a threshold queue/wait time threshold preference of "15 minutes" to highlight charging stations 112 that may include a 15 minute or less queue wait time. Accordingly, the charging station map user interface 500 may be selectively customized to pin point one or more charging stations 112 that may apply with respect to the threshold preferences. The one or more charging stations 112 may be shown as highlighted or accompanied with a user interface graphic (e.g., clock symbol) that may allow the operator to easily identify them on the charging station map user interface 500. In other embodiments, one or more charging stations 112 that may not apply with respect to the threshold preferences may be selectively hidden based on a user interface input received by the operator. It is to be appreciated that one or more charging stations 112 may be pin pointed, highlighted, accompanied with user interface graphics, and/or hidden based on user interface inputs that may be associated with various user preferences.

Specific embodiments of the presentation of the map user interface(s) will now be described. With continued reference to FIG. 1, in one embodiment the map presentation module 410 may present the charging station map interface(s) as a map that may additionally pin point one or more charging stations 112 that may be determined to be within the (default) predetermined distance of the EV 102, as determined by the charging station determinant module 406. In another embodiment, the charging station map interface(s) may also or alternatively pin point one or more charging stations 112 that may be determined to be located within a distance that the EV 102 may travel to reach the charging station(s) 112 based on the current geo-location of the EV 102, the current SOC of the battery 106 of the EV 102, and/or one or more road types that may be located within a vicinity of the current geo-location of the EV 102.

In some embodiments, the charging station map interface(s) may pin point one or more charging stations 112 that may be located within a predetermined distance of one or more prospective travel paths that are predicted to be utilized by the EV 102 based on one or more travel routines of the operator of the EV 102, as determined by the charging station determinant module 406. In additional embodiments, the charging station map interface(s) may additionally or alternatively pin point one or more charging stations 112 that may be located on or near one or more prospective travel paths of the EV 102 as predicted by the travel path prediction module 408 and that may be located within a distance that is reachable by the EV 102 based on associated prospective SOC levels of the battery 106 as predicted by the SOC determinant module 404.

In one embodiment, the map presentation module 410 may be configured to communicate with the station computing infrastructure 116 to determine one or more price schemes that may be implemented by respective charging stations 112 that are presented as pin pointed. The map presentation module 410 may be configured to present one or more price schemes and/or a summary of pricing that may be applicable to each of the respective charging stations 112 that are presented as pin pointed. The one or more charging stations 112 may be presented with an estimated cost to charge the EV 102 based on a current or prospective SOC of the EV 102 at one or more charging stations 112 based on respective price schemes. In some configurations, the map presentation module 410 may be configured to present one or more user interface input links that may be inputted by the operator of the EV 102 to determine additional pricing information and/or trends that may be applicable to the respective charging stations 112.

In another embodiment, the map presentation module 410 may be configured to communicate with the station computing infrastructure 116 to determine one or more queues/wait times (e.g., queues of electric vehicles to be charged) that are associated with respective charging stations 112. The one or more queues may be analyzed to determine respective wait times to charge the EV 102 if the EV 102 were to be added to a respective queue(s). Accordingly, the smart charge application 118 may present the charging station map user interface that includes a map that may pin point one or more charging stations 112 that include queue and wait time details that may pertain to each of the respective charging stations 112. In one configuration, the smart charge application 118 may present a user interface input that may be associated to each of the one or more charging stations 112 that may be selected by the operator to add or remove the EV 102 from a queue of a respective charging station(s) 112. Accordingly, the charging station map user interface(s) may be utilized by the operator to schedule the charging of the EV 102 at one or more charging stations(s) 112 at one or more points in time.

In some configurations, the map presentation module 410 may be configured to communicate with the station computing infrastructure 116 to determine one or more charging stations 112 that may be equipped to provide fast charging capabilities. The map presentation module 410 may be configured to present one or more of the charging stations 112 that may be equipped to provide fast charging capabilities as pin pointed on the charging station map user interface. The charging station map user interface may be presented with respective user interface inputs that may be selected to add the EV 102 to a queue of one or more charging stations that may be configured to provide fast charging capabilities to fast charge the EV 102.

In one embodiment, the map presentation module 410 may be configured to communicate with the station computing infrastructure 116 to receive incentive pricing schemes that may be provided by one or more charging station entities and/or one or more particular charging stations 112. In another embodiment, the map presentation module 410 may communicate with remote server 108 to receive incentive pricing schemes that may be stored within the station database 314 that may include records that each pertain to particular charging stations 112 and/or charging station entities as populated by one or more charging station entities. In some circumstances, the incentive pricing schemes may be provided by one or more charging station entities to incentivize customers to charge their vehicles at one or more off-peak timeframes where a demand for charging may be below an average amount. For example, many customers may tend to charge electric vehicles during hours at night with in-home charging stations (not shown). Accordingly, the incentive pricing schemes provided may be provided by one or more charging station entities to incentivize customers to charge their vehicles at one or more off-peak timeframes at one or more charging stations 112 that may be owned and/or operated by the one or more charging station entities and that are available to the public.

In some embodiments, the incentive pricing schemes may be provided by one or more charging station entities to incentivize customers to charge their vehicles at one or more off-peak timeframes at one or more charging stations 112 that may be publicly accessible and that may be located within the predetermined distance of the EV 102, near one or more prospective pathways of the EV 102, near one or more points of interest at which one or more routine activities may take place, and/or at one or more locations at which the EV 102 may need to be charged to maintain a sufficient SOC to complete one or more remaining routine activities and/or non-routine activities.

In some configurations, the map presentation module 410 may also present the charging station map user interface that may include a map that may pin point a current geo-location of the EV 102, one or more prospective geo-locations of the EV 102, and the geo-location(s) of one or more charging stations 112 that may be located within the predetermined distance of the EV 102, near one or more prospective pathways of the EV 102, near one or more points of interest at which one or more routine activities may take place, and/or at one or more locations at which the EV 102 may need to be charged to maintain a sufficient SOC to complete one or more remaining routine activities. The one or more charging stations 112 may be presented with an estimated cost to charge the EV 102 based on a current or prospective SOC of the EV 102 at one or more charging stations 112 that implement the incentive pricing schemes. Accordingly, certain attributes pertaining to a time of day, pricing schemes, retail based discounts, credits, and/or offers may be presented to the operator through the charging station map user interface to provide details with respect to one or more charging stations 112 that may provide incentives to the operator.

In one or more embodiments, the map presentation module 410 may be configured to communicate with the charging station determinant module 406 to determine the geo-location(s) of one or more additional electric vehicles 120 that may be configured provide charging power to charge the battery 106 of the EV 102. As discussed above, the additional electric vehicles 120 may additionally or alternatively be configured to receive charging power from the EV 102.

As discussed above, upon determining the respective geo-locations of the additional electric vehicles 120 the charging station determinant module 406 may be configured to analyze the current geo-location of the EV 102 as determined based on communication received from the location determinant module 402. The charging station determinant module 406 may be configured to compare the current geo-location of the EV 102 to the respective geo-locations of the additional electric vehicles 120 to determine one or more additional electric vehicles 120 that may be located within a predetermined distance of the EV 102.

The map presentation module 410 may thereby receive respective data from the charging station determinant module 406 and may present the charging station map user interface(s) with the one or more pin points that pin point the current geo-locations of one or more additional electric vehicles 120 that may be located within a predetermined distance of the EV 102. The map presentation module 410 may present a user interface input that may be associated to each of the one or more additional electric vehicles 120 that may be selected by the operator to send and/or receive vehicle to vehicle communications with one or more additional electric vehicles 120 through the communication interface 214 of the vehicle computing device 202 to reserve vehicle to vehicle charging at one or more particular user interface selectable geo-locations that are presented on the charging station map user interface(s). Accordingly, the charging station map user interface(s) may be utilized by the operator to reserve vehicle to vehicle charging of the EV 102 or from the EV 102 with one or more additional electric vehicles 120 at one or more points in time.

In some circumstances, the operator of the EV 102 and/or operators of respective additional electric vehicles 120 may set a charging rate to implement vehicle to vehicle charging through a vehicle charging rate user interface provided by the smart charge application 118. In other words, the operator(s) of the additional electric vehicle(s) 120 may set a charging rate to provide charging power to charge the EV 102 through vehicle to vehicle charging. Similarly, the operator of the EV 102 may set a charging rate to provide charging power to charge one or more additional electric vehicles 120 through vehicle to vehicle charging.

Upon the charging rates being set, the charging rate(s) may be stored upon the data store 308 of the remote server 108. In one embodiment, the map presentation module 410 may be configured to access the data store 308 to retrieve the charging rate associated with one or more respective additional electric vehicles 120 that may be located within a predetermined distance of the EV 102. The map presentation module 410 may thereby present the map user interface(s) with the one or more pin points that pin point the locations of one or more additional electric vehicles 120 that may be located within a predetermined distance of the EV 102 in addition to respective charging rates that may be charged by the respective additional electric vehicles 120.

It is to be appreciated that the map presentation module 410 may present the charging station map user interface(s) in a variety of formats that may be presented with graphics detailed within one or more of the aforementioned embodiments. Accordingly, the charging station map user interface(s) may be presented to provide various levels of information that may pertain to one or more charging stations 112 and/or additional electric vehicles 120 that may be potentially utilized to charge the EV 102 in or more manners. It is also to be appreciated that the map presentation module 410 may present the charging station map user interface(s) with additional contemplated information that may be related to utility costs, electric charging costs, a price per kWh of charging power that may include a dynamic value that may change over time based on a time of day, a season, a region, a time zone, etc., additional queue/wait time information, charging station/charging station entity incentives, and/or additional information that may be presented to the operator of the EV 102.

Figure 6:
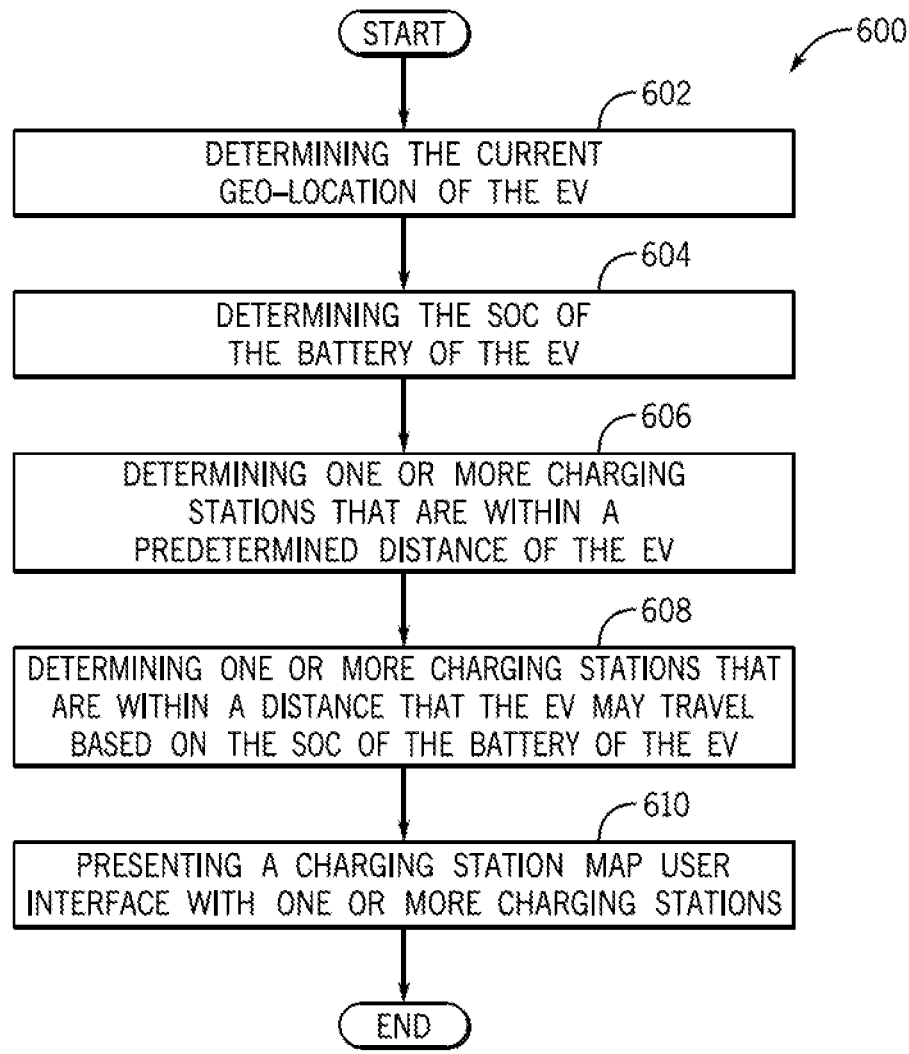
FIG. 6 is a process flow diagram of a method for presenting the charging station map user interface with one or more charging stations based on the current geo-location of an electric vehicle (EV) and the state of charge (SOC) of a battery of the EV according to an exemplary embodiment of the present disclosure.

FIG. 6 is a process flow diagram of a method 600 for presenting the charging station map user interface with one or more charging stations based on the current geo-location of the EV 102 and the SOC of the battery 106 of the EV 102 according to an exemplary embodiment of the present disclosure. FIG. 6 will be described with reference to the components of FIG. 1, FIG. 2, FIG. 3, and FIG. 4, through it is to be appreciated that the method 600 of FIG. 6 may be used with additional and/or alternative system components. The method 600 may begin at block 602, wherein the method 600 may include determining the current geo-location of the EV 102.

In an exemplary embodiment, the location determinant module 402 may be configured to communicate with the GPS 210 of the EV 102 to determine the current geo-location of the EV 102 at one or more points in time. In some embodiments, the location determinant module 402 may be configured to store one or more geo-locations of the EV 102 as determined at one or more points in time within the data store 208 of the vehicle computing device 202 and/or the data store 308 of the remote server 108.

The method 600 may proceed to block 604, wherein the method 600 may include determining the SOC of the battery 106 of the EV 102. As discussed above, the SOC determinant module 404 may be configured to determine the current SOC of the battery 106 of the EV 102. In one configuration, the SOC determinant module 404 may be configured to communicate with the processor 204 of the vehicle computing device 202 to determine the current SOC of the battery 106 of the EV 102. In one embodiment, the processor 204 may be configured to communicate with a microprocessor (not shown) that may be included as part of electrical circuitry of the battery 106 to determine a current SOC of the battery 106. The SOC determinant module 404 may be additionally configured to analyze the current geo-location of the EV 102 and determine a remaining distance that the EV 102 is capable of traveling. The remaining distance may be determined based on analyzing the current SOC of the battery 106, an average speed of the EV 102, and/or one or more road types (e.g., local, highway, road grades) that may be located within a vicinity of the current geo-location of the EV 102. Upon determining the current SOC and remaining distance that the EV 102 may travel at the average speed of the EV 102, the SOC determinant module 404 may communicate respective data to the charging station determinant module 406.

The method 600 may proceed to block 606 wherein the method 600 may include determining one or more charging stations 112 that are within a predetermined distance of the EV 102. In one embodiment, upon receiving data pertaining to a current geo-location of the EV 102, the charging station determinant module 406 may be configured to determine geo-locations of one or more charging stations 112 that may be located within the predetermined distance of the current geo-location of the EV 102. In particular, the charging station determinant module 406 may be configured to access and query the station database 314 to determine one or more charging stations 112 that may be located within the predetermined distance (e.g., 5 miles) of the current geo-location of the EV 102. Upon determining the one or more charging stations 112 that may be located within the predetermined distance of the current geo-location of the EV 102, the charging station determinant module 406 may communicate data pertaining to the one or more charging stations 112 to the map presentation module 410 of the smart charge application 118.

The method 600 may proceed to block 608 wherein the method 600 may include determining one or more charging stations 112 that are within a distance that the EV 102 may travel based on the SOC of the battery 106 of the EV 102. In one embodiment, the charging station determinant module 406 may be configured to analyze the current geo-location of the EV 102 as determined and communicated by the location determinant module 402 in addition to the current SOC and remaining distance that the EV 102 may travel as determined and communicated by the SOC determinant module 404. The charging station determinant module 406 may thereby be configured to access and query the station database 314 to determine one or more charging stations 112 that may be located within a distance that the EV 102 may travel to reach the charging station(s) 112 based on the current geo-location of the EV 102, the current SOC of the battery 106 of the EV 102, and/or one or more road types (e.g., local, highway, road grades) that may be located within a vicinity of the current geo-location of the EV 102. Upon determining the one or more charging stations 112 that may be located within a distance that the EV 102 may travel based on the SOC of the battery 106 of the EV 102, the charging station determinant module 406 may communicate data pertaining to the one or more charging stations 112 to the map presentation module 410 of the smart charge application 118.

The method 600 may proceed to block 610, wherein the method 600 may include presenting a charging station map user interface with one or more charging stations 112. In one embodiment the map presentation module 410 may present the charging station map interface through the display unit of the EV 102 and/or through the display of the portable device 222. The charging station map interface may be presented as a map that may pin point one or more charging stations 112 that may be determined to be within the predetermined distance of the EV 102, as determined by the charging station determinant module 406. Additionally, the charging station map interface may pin point one or more charging stations 112 that may be determined to be located within a distance that the EV 102 may travel to reach the charging station(s) 112 based on the current geo-location of the EV 102, the current SOC of the battery 106 of the EV 102, and/or one or more road types that may be located within a vicinity of the current geo-location of the EV 102.

The charging station map interface may present information that may pertain to the one or more charging stations 112 that may be pin pointed. Such information may include, but may not be limited to, prospective and/or real-time price data, information regarding queues and/or wait times that are associated to respective charging stations 112, information regarding fast charging capabilities, and/or pricing incentives that may be provided by the respective charging stations 112.

Figure 7:
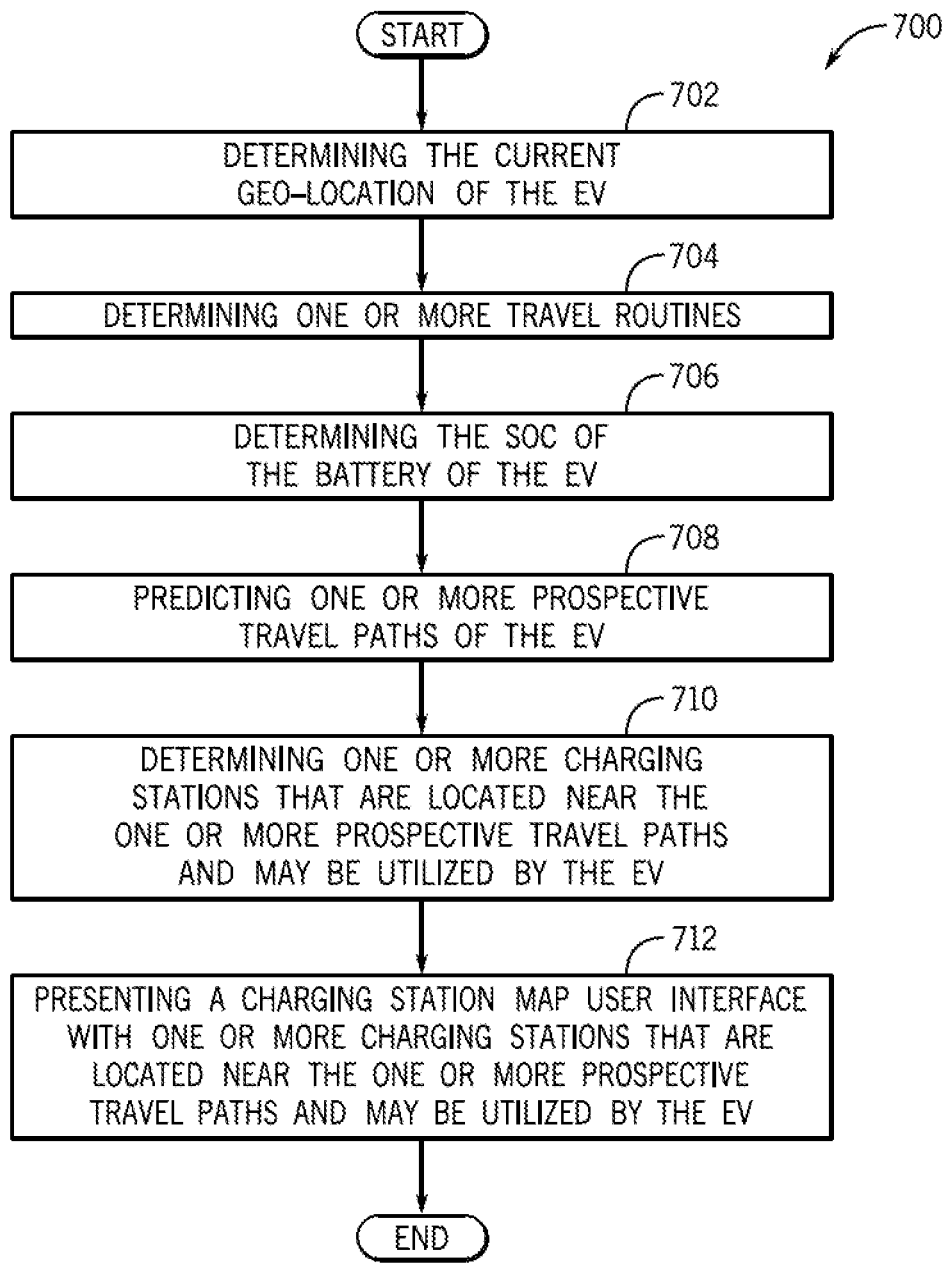
FIG. 7 is a process flow diagram of a method for presenting the charging station map user interface with one or more charging stations that are located near one or more prospective travel paths that may be utilized by the EV 102 according to an exemplary embodiment of the present disclosure.

FIG. 7 is a process flow diagram of a method 700 for presenting the charging station map user interface with one or more charging stations that are located near one or more prospective travel paths that may be utilized by the EV 102 according to an exemplary embodiment of the present disclosure. FIG. 7 will be described with reference to the components of FIG. 1, FIG. 2, FIG. 3, and FIG. 4, through it is to be appreciated that the method 700 of FIG. 7 may be used with additional and/or alternative system components.

The method 700 may begin at block 702, wherein the method 700 may include determining the current geo-location of the EV 102.

In an exemplary embodiment, the location determinant module 402 may be configured to communicate with the GPS 210 of the EV 102 to determine the current geo-location of the EV 102 at one or more points in time. In some embodiments, the location determinant module 402 may be configured to store the one or more geo-locations of the EV 102 determined at one or more points in time within the data store 208 of the vehicle computing device 202 and/or the data store 308 of the remote server 108.

The method 700 may proceed to block 704, wherein the method 700 may include determining one or more travel routines. As discussed above, the location log 224 stored on the data store 208 of the vehicle computing device 202 may include a log of locations at which the EV 102 is driven, parked, and/or charged. In one configuration, the travel path prediction module 408 may analyze the location log 224 to determine one or more point of interest locations that may be frequently and/or routinely traveled to by the EV 102. In particular, the travel path prediction module 408 may analyze point of interest data (not shown) that may be stored on the data store 208 of the vehicle computing device 202 and/or the data store 308 of the remote server 108 to determine one or more points of interest locations that may be frequently and/or routinely traveled to by the EV 102.

Upon analyzing the location log 224, the travel path prediction module 408 may be configured to determine one or more travel routines that may be followed by the operator of the EV 102. In some configurations, the one or more travel routines may be analyzed through the neural network to provide computer/machine based/deep learning techniques to determine whether a particular trip of the EV 102 is a routine trip or non-routine trip based on the analysis of data provided by the GPS 210.

The method 700 may proceed to block 706, wherein the method 700 may include determining the SOC of the battery of the EV 102. In one configuration, the SOC determinant module 404 may be configured to communicate with the processor 204 of the vehicle computing device 202 to determine the current SOC of the battery 106 of the EV 102. In one embodiment, the processor 204 may be configured to communicate with a micro-processor (not shown) that may be included as part of electrical circuitry of the battery 106 to determine a current SOC of the battery 106. The SOC determinant module 404 may be additionally configured to analyze the current geo-location of the EV 102 and determine a remaining distance that the EV 102 is capable of traveling. The remaining distance may be determined based on analyzing the current SOC of the battery 106, an average speed of the EV 102, and/or one or more road types (e.g., local, highway, road grades) that may be located within a vicinity of the current geo-location of the EV 102. Upon determining the current SOC and remaining distance that the EV 102 may travel at the average speed of the EV 102, the SOC determinant module 404 may communicate respective data to the travel path prediction module 408 and/or the charging station determinant module 406.

The method 700 may proceed to block 708, wherein the method 700 may include predicting one or more prospective travel paths of the EV 102. In one embodiment, the travel path prediction module 408 may analyze the current geo-location of the EV 102 at one or more points in time with respect a particular timeframe of utilization of the EV 102, the current SOC of the battery 106 of the EV, the remaining distance that the EV 102 may travel, and/or one or more routine trips that may be determined (at block 704) to thereby predict one or more prospective travel paths (e.g., routes, roads, highways, etc.) that may be utilized by the EV 102 to reach one or more points of interest locations that may be frequently and/or routinely traveled to by the EV 102. The travel path prediction module 408 may thereby communicate data pertaining to the prospective travel routes to the charging station determinant module 406.

The method 700 may proceed to block 710, wherein the method 700 may include determining one or more charging stations 112 that are located near one or more prospective travel paths and that may be utilized by the EV 102. In one embodiment, upon receiving data pertaining to one or more prospective travel routes of the EV 102, the charging station determinant module 406 may be configured to access and query the station database 314 to determine one or more charging stations 112 that may be located within a predetermined distance of one or more prospective travel paths that are predicted to be utilized by the EV 102 based on one or more travel routines of the operator of the EV 102, the current geo-location of the EV 102, the current SOC of the EV 102, and/or the remaining distance that the EV 102 may travel.

Accordingly, the charging station determinant module 406 may determine one or more charging stations 112 that may be located on or near one or more prospective travel paths of the EV 102 as predicted by the travel path prediction module 408 and that may be located within a distance that is reachable by the EV 102 based on associated prospective SOC levels of the battery 106 that may be predicted by the SOC determinant module 404, as discussed above. In one embodiment, the charging station determinant module 406 may be configured to communicate data associated with the one or more charging stations 112 that are determined to be located near the one or more prospective travel paths to the map presentation module 410 of the smart charge application 118.

The method 700 may proceed to block 712, wherein the method 700 may include presenting a charging station map user interface with one or more charging stations 112 that are located near the one or more prospective travel paths and may be utilized by the EV 102. In an exemplary embodiment, the map presentation module 410 of the smart charge application 118 may be configured to present one or more charging station map user interfaces that may present the map of one or more charging stations 112 that are determined to be located near the one or more prospective travel paths and that may be utilized by the EV 102. In particular, the one or more charging stations 112 that are determined to be located near the one or more prospective travel paths and that may be utilized by the EV 102 may be presented as pin pointed to allow the operator to determine the location of the charging station(s) 112 with respect to the current or prospective (predicted) locations of the EV 102.

In one or more embodiments, the charging station map interface may present information that may pertains to the one or more charging stations 112 that may be pin pointed. Such information may include, but may not be limited to, prospective and/or real-time price data, information regarding queues and/or wait times that are associated to respective charging stations 112, information regarding fast charging capabilities, and/or pricing incentives that may be provided by the respective charging stations 112.

Figure 8:
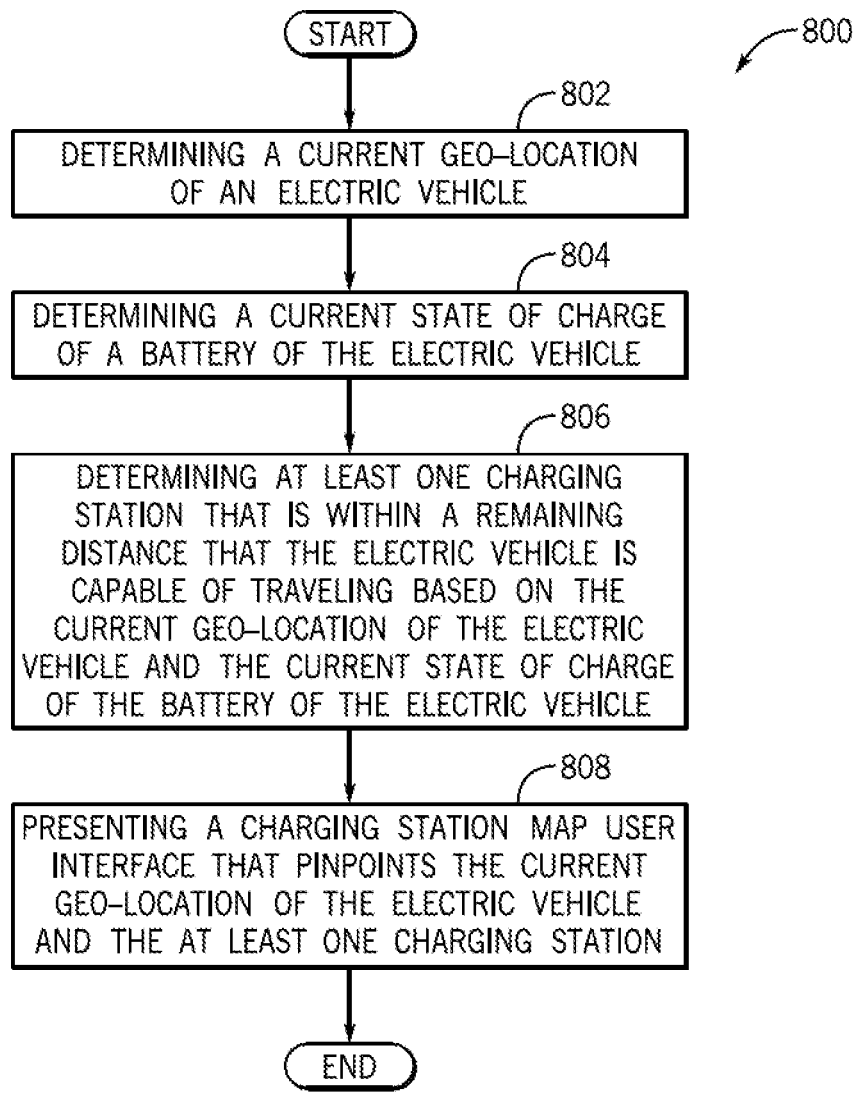
FIG. 8 is a process flow diagram of a method for presenting electric vehicle charging options according to an exemplary embodiment of the present disclosure.

FIG. 8 is a process flow diagram of a method 800 for presenting electric vehicle charging options according to an exemplary embodiment of the present disclosure. FIG. 8 will be described with reference to the components of FIG. 1, FIG. 2, FIG. 3, and FIG. 4, through it is to be appreciated that the method 800 of FIG. 8 may be used with additional and/or alternative system components. The method 800 may begin at block 802, wherein the method 800 may include determining a current geo-location of an electric vehicle 102.

The method 800 may proceed to block 804, wherein the method 800 may include determining a current state of charge of a battery 106 of the electric vehicle 102. The method 800 may proceed to block 806, wherein the method 800 may include determining at least one charging station 112 that is within a remaining distance that the electric vehicle 102 is capable of traveling based on the current geo-location of the electric vehicle 102 and the current state of charge of the battery 106 of the electric vehicle 102. The method 800 may proceed to block 808, wherein the method 800 may include presenting a charging station map user interface that pin points the current geo-location of the electric vehicle 102 and the at least one charging station 112.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for presenting electric vehicle charging options, comprising:
   determining a current geo-location of an electric vehicle;
   determining a current state of charge of a battery of the electric vehicle and predicting a prospective state of charge level of the battery of the electric vehicle that is based on the current state of charge, an average speed of the electric vehicle, and at least one road type of at least one prospective travel path of the electric vehicle that is predicted to be utilized by the electric vehicle;
   determining at least one travel routine of an operator of the electric vehicle by analyzing a location log of the electric vehicle;

analyzing the at least one travel routine through a neural network to determine whether a particular trip of the electric vehicle is a routine trip or a non-routine trip of the electric vehicle;

predicting the at least one prospective travel path by analyzing the current geo-location of the electric vehicle and geo-locations of the electric vehicle at one or more points in time with respect to a particular timeframe of current utilization of the electric vehicle and analyzing the particular trip as determined to be a routine trip or a non-routine trip;

determining at least one charging station that is within a remaining distance that the electric vehicle is capable of traveling based on the current geo-location of the electric vehicle, the at least one road type of the at least one prospective travel path, and the prospective state of charge of the battery of the electric vehicle; and presenting a charging station map user interface that pin points the current geo-location of the electric vehicle, at least one prospective geo-location of the electric vehicle on the at least one prospective travel path, and the at least one charging station, further including determining a current geo-location of at least one additional electric vehicle that is capable of charging the electric vehicle and pin pointing on the charging station map user interface the current geo-location of the additional electric vehicle including presenting a charging rate to implement vehicle to vehicle charging with the least one additional electric vehicle.

2. The computer-implemented method of claim 1, further including determining the remaining distance that the electric vehicle is capable of traveling based on analyzing the current state of charge of the electric vehicle, an average speed of the electric vehicle, and the at least one road type that is located within a vicinity of the current geo-location of the electric vehicle.

3. The computer-implemented method of claim 2, wherein determining the at least one charging station that is within the remaining distance includes analyzing the current geo-location of the electric vehicle, the current state of charge of the electric vehicle, and the remaining distance that the electric vehicle is capable of traveling and querying a station database to determine the at least one charging station that is within the remaining distance that the electric vehicle is capable of traveling.

4. The computer-implemented method of claim 1, wherein the location log includes a log of locations at which the electric vehicle is driven, parked, and charged.

5. The computer-implemented method of claim 1, further including predicting the at least one prospective travel path of the electric vehicle, wherein the current geo-location of the electric vehicle, the current state of charge of the battery of the electric vehicle, and the at least one travel routine is analyzed to predict the at least one prospective travel path of the electric vehicle.

6. The computer-implemented method of claim 5, wherein determining the at least one charging station that is within the remaining distance that the electric vehicle is capable of traveling includes determining at least one charging station that is within a predetermined distance of the at least one prospective travel path of the electric vehicle.

7. The computer-implemented method of claim 6, wherein presenting the charging station map user interface includes pin pointing the at least one charging station that is within the predetermined distance of the at least one prospective travel path of the electric vehicle.

8. The computer-implemented method of claim 1, wherein presenting the charging station map user interface includes presenting at least one of: a price scheme, a queue wait time, and an incentive that is associated with the at least one charging station.

9. A system for presenting electric vehicle charging options, comprising:
a memory storing instructions when executed by a processor cause the processor to:
determine a current geo-location of an electric vehicle;
determine a current state of charge of a battery of the electric vehicle and predict a prospective state of charge level of the battery of the electric vehicle that is based on the current state of charge, an average speed of the electric vehicle, and at least one road type of at least one prospective travel path of the electric vehicle that is predicted to be utilized by the electric vehicle;
determine at least one travel routine of an operator of the electric vehicle by analyzing a location log of the electric vehicle;
analyze the at least one travel routine through a neural network to determine whether a particular trip of the electric vehicle is a routine trip or a non-routine trip of the electric vehicle;
predict the at least one prospective travel path by analyzing the current geo-location of the electric vehicle and geo-locations of the electric vehicle at one or more points in time with respect a particular timeframe of current utilization of the electric vehicle and analyzing the particular trip as determined to be a routine trip or a non-routine trip;
determine at least one charging station that is within a remaining distance that the electric vehicle is capable of traveling based on the current geo-location of the electric vehicle, the at least one road type of the at least one prospective travel path, and the prospective state of charge of the battery of the electric vehicle;
present a charging station map user interface that pin points the current geo-location of the electric vehicle, at least one prospective geo-location of the electric vehicle on the at least one prospective travel path, and the at least one charging station; and
determine a current geo-location of at least one additional electric vehicle that is capable of charging the electric vehicle, pin point on the charging station map user interface the current geo-location of the additional electric vehicle, and present a charging rate to implement vehicle to vehicle charging with the least one additional electric vehicle.

10. The system of claim 9, wherein presenting the charging station map user interface includes presenting at least one of: a price scheme, a queue wait time, and an incentive that is associated with the at least one charging station.

11. The system of claim 9, further including determining the remaining distance that the electric vehicle is capable of traveling based on analyzing the current state of charge of the electric vehicle, an average speed of the electric vehicle, and the at least one road type that is located within a vicinity of the current geo-location of the electric vehicle.

12. The system of claim 11, wherein determining the at least one charging station that is within the remaining distance includes analyzing the current geo-location of the electric vehicle, the current state of charge of the electric vehicle, and the remaining distance that the electric vehicle is capable of traveling and querying a station database to determine the at least one charging station that is within the remaining distance that the electric vehicle is capable of traveling.

13. The system of claim 9, wherein the location log that includes a log of locations at which the electric vehicle is driven, parked, and charged.

14. The system of claim 9, further including predicting the at least one prospective travel path of the electric vehicle, wherein the current geo-location of the electric vehicle, the current state of charge of the battery of the electric vehicle, and the at least one travel routine is analyzed to predict the at least one prospective travel path of the electric vehicle.

15. The system of claim 14, wherein determining the at least one charging station that is within the remaining distance that the electric vehicle is capable of traveling includes determining at least one charging station that is within a predetermined distance of the at least one prospective travel path of the electric vehicle.

16. The system of claim 15, wherein presenting the charging station map user interface includes pin pointing the at least one charging station that is within the predetermined distance of the at least one prospective travel path of the electric vehicle.

17. A non-transitory computer readable storage medium storing instructions that when executed by a computer, which includes a processor perform a method, the method comprising:
  determining a current geo-location of an electric vehicle;
  determining a current state of charge of a battery of the electric vehicle and predicting a prospective state of charge level of the battery of the electric vehicle that is based on the current state of charge, an average speed of the electric vehicle, and at least one road type of at least one prospective travel path of the electric vehicle that is predicted to be utilized by the electric vehicle;
  determining at least one travel routine of an operator of the electric vehicle by analyzing a location log of the electric vehicle;
  analyzing the at least one travel routine through a neural network to determine whether a particular trip of the electric vehicle is a routine trip or a non-routine trip of the electric vehicle;
  predicting the at least one prospective travel path by analyzing the current geo-location of the electric vehicle and geo-locations of the electric vehicle at one or more points in time with respect a particular timeframe of current utilization of the electric vehicle and analyzing the particular trip as determined to be a routine trip or a non-routine trip;
  determining at least one charging station that is within a remaining distance that the electric vehicle is capable of traveling based on the current geo-location of the electric vehicle, the at least one road type of the at least one prospective travel path, and the prospective state of charge of the battery of the electric vehicle; and
  presenting a charging station map user interface that pin points the current geo-location of the electric vehicle, at least one prospective geo-location of the electric vehicle on the at least one prospective travel path, and the at least one charging station,
  further including determining a current geo-location of at least one additional electric vehicle that is capable of charging the electric vehicle and pin pointing on the charging station map user interface the current geo-location of the additional electric vehicle including presenting a charging rate to implement vehicle to vehicle charging with the least one additional electric vehicle.

18. The non-transitory computer readable storage medium of claim 17, wherein presenting the charging station map user interface includes presenting at least one of: a price scheme, a queue wait time, and an incentive that is associated with the at least one charging station.

* * * * *